US006167447A

United States Patent [19]

[11] Patent Number: 6,167,447

[45] Date of Patent: Dec. 26, 2000

Tice

[54] MULTI-PROCESSOR COMMUNICATION SYSTEM WHEREIN MULTIPLE SOURCES CAN TRANSMIT INFORMATION DURING THE TRANSMISSION OF A SINGLE MESSAGE

[75] Inventor: Lee D. Tice, Bartlett, Ill.

[73] Assignee: Pittway Corporation, Chicago, Ill.

[21] Appl. No.: 08/906,277

[22] Filed: Aug. 5, 1997

[51] Int. Cl.[7] .......................... G06F 15/173; G06F 15/16

[52] U.S. Cl. .......................... 709/224; 709/225; 709/230; 709/236

[58] Field of Search .......................... 395/200.54, 200.66, 395/200.73, 200, 200.55, 200.31, 200.34, 200.35, 182.02, 200.07, 200.02; 370/89, 85.5; 709/224, 225, 230, 236

[56] References Cited

U.S. PATENT DOCUMENTS

| | | | |
|---|---|---|---|
| 4,209,840 | 6/1980 | Beradi et al. | 364/200 |
| 4,566,097 | 1/1986 | Bederman | 370/89 |
| 4,724,521 | 2/1988 | Carron et al. . | |
| 4,757,456 | 7/1988 | Benghiat . | |
| 4,949,299 | 8/1990 | Pickett | 364/900 |
| 5,459,836 | 10/1995 | Whittaker et al. | 395/200.07 |
| 5,463,763 | 10/1995 | Kubo | 395/182.02 |
| 5,566,178 | 10/1996 | Butter et al. | 370/85.5 |
| 5,592,621 | 1/1997 | Rabinovich et al. | 395/200.02 |
| 5,592,622 | 1/1997 | Isfeld et al. . | |

FOREIGN PATENT DOCUMENTS

| | | |
|---|---|---|
| 0 229 198 A1 | 7/1987 | European Pat. Off. . |
| 0 439 331 A2 | 7/1991 | European Pat. Off. . |
| 2 295 070 | 5/1996 | United Kingdom . |

OTHER PUBLICATIONS

Copy of Search Report from European counterpart Application No. 98305847.0–2215–dated Feb. 11, 2000.

*Primary Examiner*—Glenton B. Burgess
*Assistant Examiner*—Quoc-Khanh Le
*Attorney, Agent, or Firm*—Rockey, Milnamow & Katz, Ltd.

[57] ABSTRACT

A multi-processor system makes it possible to enhance information transmitted between processors. Any one of the processors can inject information into a data transmission between other processors. The injected information can identify or indicate the location of one processor with respect to another processor. Alternately, it can define which processor or processors should respond or specify an action to be taken. Where one processor is transmitting to another processor, a third processor, upon detecting the transmission, can insert additional information into the transmission sequence at an appropriate location. A fourth processor, also monitoring the communications sequence could insert additional information into the same sequence as well.

33 Claims, 1 Drawing Sheet

FIG. 1
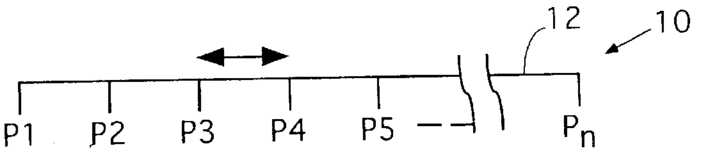
FIG. 2A
M13
HEADER: 1→ 3; INFO 1→ 3; TRAILER
FIG. 2B
M13; 23 SUPP.
HEADER: 1→ 3; INFO 1→ 3; INFO 2→ 3; TRAILER
FIG. 2C
M13; 23; 43 SUPP. SUPP.
HEADER: 1→ 3; INFO 1→ 3; INFO 2→ 3; INFO 4→ 3; TRAILER
FIG. 3
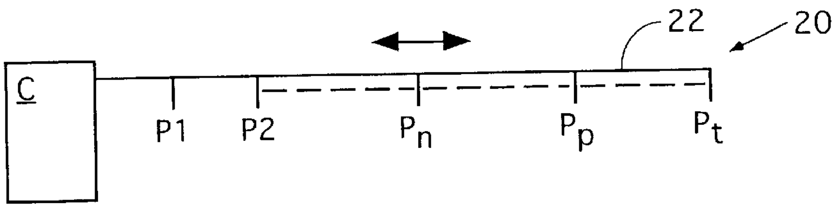
FIG. 3A
$M_{1t}$
$SM_{2t}$
$SM_{nt}$
FIG. 3B
SUPP. SUPP.
HEADER: 1→ t; INFO 1→ t; INFO 2→ t; INFO n→ t; TRAILER
FIG. 4A
$M_{1t}$
SMC→ $^{p}_{t}$ ;
FIG. 4B
SUPP.
HEADER: 1→ t; INFO 1→ t; INFO C→ p and t; TRAILER

MULTI-PROCESSOR COMMUNICATION SYSTEM WHEREIN MULTIPLE SOURCES CAN TRANSMIT INFORMATION DURING THE TRANSMISSION OF A SINGLE MESSAGE

FIELD OF THE INVENTION

The invention pertains to multi-processor communications systems. More particularly, the invention pertains to such systems which can be used to monitor conditions in regions or buildings of interest and to subsequently act on the results of the monitoring process.

BACKGROUND OF THE INVENTION

Ambient condition detection systems, such as fire detection systems are known to be useful in providing early warnings of potentially dangerous conditions such as fires. One such system as disclosed and claimed in Tice et al. U.S. Pat. No. 4,916,432 entitled *Smoke and Fire Detection System Communication* assigned to the Assignee hereof. The disclosure thereof is incorporated by reference herein.

The system of the Tice et al. patent, as well as many other known systems, make use of a master-slave communication protocol. In such systems, a common control element is coupled via a communication link to a plurality of ambient condition detectors or transducers.

The control element transmits commands to addressed detectors, devices, groups of detectors or devices. The devices or detectors respond with transmissions of information pertaining to status or detect an ambient condition which the control element analyzes and acts upon as appropriate.

While the master-slave communication protocol is useful and effective, its usefulness is at times limited by an inability to respond to equipment or transmission failures by operating in a degraded mode.

One known attempt to provide operation in a degraded mode, requires that the devices each be assigned a unique serial number. In the event that for some reason the control element is unable to communicate with a respective device, and the device detects an ambient condition calling for an alarm, the respective device can communicate directly with an output element such as a horn or a strobe thereby continuing to be able to provide an indication of the existence of a potential fire. Another known system permits some of the processors to be programmed to transmit information to other processors, as opposed to the control element. The other processors are in turn programmed to respond to the transmitted information.

A disadvantage of known systems is their limited flexibility. Further, the systems which permit specific devices to be programmed to transmit information to other devices which are in turn programmed to respond to that information require extensive programming, which can be very device specific. The communication protocol in such systems requires very long transmissions between devices.

Hence, there continues to be a need for communication systems useable in multi-processor environments wherein various of the processors are able to readily communicate among one another, in addition to being able to communicate with a common control element if such is present. It would be desirable to implement such a communication process using software which is common to all of the processors. It would also be preferable if all of the processors in the system have the ability to intercommunicate among one another as well as to be able to communicate with the common control element, assuming such was present. Finally, it would be preferable if each of the processors was able to respond to communications from another processor with or without additional information being provided by perhaps second, third or fourth additional processors in the system.

SUMMARY OF THE INVENTION

Methods and apparatus in accordance with the invention provide for intervention and insertion of additional information by a third processor in an ongoing communication sequence between first and second processors. In one aspect, in accordance with the method, a first processor initiates a communication sequence to a second processor.

The communication sequence can include an address or directing segment and a primary information segment intended for use by a receiving or a second processor. A third processor, capable of monitoring the transmission, can insert a second information segment into the communication sequence being transmitted between the first and second processors.

In yet another aspect, a fourth processor, also capable of monitoring the communication sequence, is capable of inserting a second additional information sequence into the sequence. Inserts by the third and fourth processors into the communication sequence can be at the beginning or the end thereof or interleaved therewith without limitation.

The receiving, or second processor in turn processes the primary information as well as information from the third and fourth intervening processors and respond thereto. The receiving processor can in turn initiate a confirmatory or informational message to any or all of those participating in the initial communication.

In yet another aspect, a system can include a primary control element coupled to a common communication link. A plurality of additional processors can in turn be coupled to the communication link.

Communications can be initiated by the primary control element as well as any of the processors. The primary control element and the processors can initiate transmissions or communications between one another, as described above, wherein one or more of the processors can append to or inject into a primary information sequence supplemental information sequences.

In yet another aspect, the processors can be coupled to different communication links and could be located for example on different networks which have a capability to communicate with one another. In such an instance, a monitoring processor would be able to couple an additional information segment to a primary information segment being transmitted between first and second processors which might be located on spaced apart networks.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 1 is an overall block diagram of a multi-processor system in accordance with the present invention;

FIGS. 2A–2C illustrate exemplary message transmissions between processors of the system of FIG. 1;

FIG. 3 illustrates an alternate form of a multi-processor communication system and exemplary message transmission therein;

FIGS. 3A and 3B illustrate exemplary message transmissions between processors of the system of FIG. 3; and FIGS. 4A–4B illustrate an alternate form of transmission carried out by the system of FIG. 3.

DETAILED DESCRIPTION OF THE PREFERRED EMBODIMENTS

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates a multi-processor system 10 wherein the processors P1 . . . Pn are capable of communicating with one another along a common transmission link 12. It will be understood that the exact form of the link 12 is not a limitation of the present invention although it is preferable that it be bidirectional.

The processors P1 . . . Pn preferably are programmable processors which can carry out preprogrammed transmission and reception functions. Some of the transmissions may change operating programs at a given receiving processor without departing from the spirit and scope of the present invention.

The processors P1 . . . Pn can be configured with any available architecture without departing from the spirit and scope of the present invention. The present method improves the ability of multi-processor systems, such as the system 10 to enhance information transmitted between processors by enabling any one of the processors monitoring the link 12 to insert information into messages being transmitted to other processors on the link while the transmission is in process. Hence, any processor monitoring the link will be able to insert information into a communication initiated by any other processor thereby enhancing and adding to the information being transmitted in a given message.

FIG. 2 illustrates schematically message transfers in accordance with the present invention. FIG. 2A illustrates a basic message transfer format between processor P1 and processor P3. This includes a header which can include address information indicating a transmission between P1 and P3, information to be transmitted between P1 and P3 which could include data, programs or the like without limitation and an end-of-message defining trailer.

FIG. 2B illustrates a message format initiated by processor P1 and directed to processor P3 as in FIG. 2A, which has been supplemented by an insertion into the message by monitoring processor P2 directed to processor P3. FIG. 2C illustrates an alternate transmission initiated by processor 1, extended by processor 2 and extended again by processor 4. In the message of FIG. 2C the supplemental information provided by processor 2, directed to processor 3 is in turn supplemented by information from processor 4 directed to processor 3.

FIG. 3 illustrates a particular form of a multiprocessor communication system 20. In the system 20 a plurality of processors P1 . . . Pt are coupled to a common communication link 22. The link is in turn coupled to a master control element C. As was the case with the system 10, the processors of the system 20 can all be adapted to be able to communicate between one another. In this embodiment, the master control element C is just another processor on the communication link 22.

In a particular form of the system 20, processors such as P1, P2 . . . Pn could also incorporate various types of transducers. For example, transducers of interest include fire detectors, motion detectors, sound detectors and the like.

The processors P1 . . . Pn can provide information not only to one another but also to the control element C indicative of sensed ambient conditions. Others of the processors for example, processor Pp . . . Pt can include circuitry for carrying out various types of functions which include opening or closing switches or relays or the like so as to effect actions in the region being supervised. Typical types of actions include locking or unlocking doors or other equipment, energizing alarm indicating devices including audible and visible output devices.

In the case of the system 20, the supplemental information inserted into messages sent between processors can be used to identify the location of a given processor with respect to other processors, specify which processors should respond to the information or indicate the type of action to be taken.

FIG. 3A illustrates a basic message initiated at processor P1 directed to processor Pt. That message is in turn supplemented by a message from processor P2 also directed to processor Pt. Finally, the message is supplemented further by communication from processor Pn directed to processor Pt.

FIG. 3B illustrates additional details of the message of FIG. 3A.

By way of example, if processors P1 and P2 included ambient condition sensors, for example smoke detectors, the initiating message from processor P1 to processor Pt could for the purpose of indicating to processor Pt that processor P1 has determined that it has detected an ambient condition level, for example a level of smoke, which has equaled or exceeded a predetermined portion of the preset threshold. The supplemental message from processor P2 could in turn indicate that it is not only physically located near processor P1 but it had previously detected a similar level of the respective ambient condition. Similarly processor Pn can supplement the message by indicating that it is near processor P2 and that it too has detected an ambient condition at a predetermined level.

In the event that the processor Pt is associated with an output device, the information received in the message indicates that these three processors, located near one another, had detected an ambient condition which exceeded a predetermined threshold. If desired the various processor could be preprogrammed with information indicative of their locations with respect to other processors. Such information could then be provided for example to the processor Pt.

The information received by the processor Pt could in turn be used as a basis for determining what action to be taken next. This could include activating one or more alarm devices, activating one or more fire suppression systems in the event that the system 20 is a fire detection system, initiating calls to appropriate fire and police authorities in the event that such action is appropriate.

FIGS. 4A and 4B illustrate an alternate message sequence. For example, as illustrated in FIG. 4A a primary message is intended to be transmitted between processor P1 and Pt. This message is supplemented by information provided by control element C directed to not only processor Pt but also processor Pp. For example, control element C could be providing information which would direct the processor Pt to operate or respond to the message received. This information can also direct the processor Pp to respond to the message. In this case, the control element C has supplemented the information provided by processor P1 with the result that both processors Pp and Pt respond to the basic message from processor P1.

In the instance where the system 20 represents a fire detection system, the present method can be used to incorporate grouping information into a message or messages from one or more processors. Such grouping information is beneficial in that it may limit the local memory requirements at a given processor.

Other message examples include one processor directing another to delay responding or taking action for a predetermined period of time. Other commands can be issued by the control element C or information provided by other processors on the link 22 to supplement a given message.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. In a distributed processor system, a method of interprocessor communication using a communications link comprising:

initiating transmission of a message including a first information carrying communication sequence on the link from a first to a second processor;

detecting the communication sequence at a third processor and in response thereto, coupling a second information carrying sequence to the link as part of said message including said first information carrying communication sequence, wherein the second sequence includes information for the second processor not present in the first sequence.

2. A method as in claim 1 wherein the initiating step includes generating a header sequence as part of said message in addition to said first information sequence to be sent to the second processor.

3. A method as in claim 1 wherein at least a portion of the first information carrying sequence includes commands to be executed at the second processor.

4. A method as in claim 1 wherein at least a portion of the second information sequence includes commands to be executed at the second processor.

5. A method as in claim 1 wherein the second information carrying sequence is coupled to the link subsequent to completion of transmission of the first sequence.

6. A method as in claim 1 which includes, at the second processor, sensing a predetermined ambient condition and, in response to at least the first information carrying sequence, transmitting sensed ambient condition information to the first processor.

7. A method as in claim 6 wherein the first processor detects the presence of an alarm condition in response to received ambient condition information.

8. A method as in claim 1 which includes detecting the communication sequence at a fourth processor and in response thereto coupling a third information carrying sequence to the link wherein the third sequence includes information for the second processor not present in either of the other sequences.

9. A method as in claim 1 which includes coupling at least some of the processors to a common communication link.

10. A method of communication in an ambient condition supervision system which includes a control element coupled via at least one communication link, to a plurality of spaced apart modules, the method comprising:

initiating transmission of a message including a first information carrying sequence, from one of the control element and a first module, to one of the control element and a second module;

detecting transmission of the first information carrying sequence at one of the control element and a third module and in response thereto, initiating transmission of a second information carrying sequence as part of said message including said first information carrying communication sequence, from one of the control element and the third module, to one of the control element and the second module.

11. A method as in claim 10 wherein at least some of the modules include ambient condition sensors, the method further including sensing ambient conditions adjacent to respective ones of the sensors.

12. A method as in claim 11 including transmitting indicia of sensed ambient conditions from respective ones of the sensors to the control element.

13. A method as in claim 11 which includes analyzing outputs from the sensors to determine if a predetermined ambient condition profile has been detected.

14. A method as in claim 10 which includes in the initiating step, forming a message header and specifying at least one of the control element and the plurality of spaced apart modules as the message recipient.

15. A method as in claim 14 which includes appending a message segment to the header.

16. A method as in claim 15 which includes appending a message trailer to the message segment.

17. A method as in claim 10 wherein transmission of the second information carrying sequence is initiated prior to termination of transmission of the first sequence.

18. A method as in claim 10 which includes coupling at least some of the modules to a common communications link.

19. In a distributed processor system, a method of interprocessor communication using a communications link where multiple processors are capable of initiating a communication sequence comprising:

initiating transmission of a message including a first information carrying communication sequence on the link from a first processor;

detecting the communication sequence at a second processor and in response thereto, coupling a second information carrying sequence to the link as part of said message including said first information carrying communication sequence, wherein the second sequence includes information not present in the first sequence and intended for processors other than the first processor.

20. A supervisory system for monitoring a region comprising:

a first plurality of modules;

a bidirectional communications link coupled to members of the first plurality wherein at least some members of the plurality are adapted to initiate a message including a first communication sequence, via the link, to the members of the plurality, wherein some of the members of the plurality are adapted to monitor the link, and in response to a monitored communication to another member of the plurality, initiate an additional communication sequence to the other members of the plurality as part of said message including said first communication sequence.

21. A system as in claim 20 wherein at least some of the communication initiating modules include transducers.

22. A system as in claim 20 wherein some of the transducers include ambient condition sensors.

23. In a distributed processor system including a central controller and multiple processors interconnected on a communication link, a method of inter-processor communication using a communications links comprising:

transmitting a single message comprised of sequences of information from two or more processors;

transmitting a start of message signal by the central controller to start the message sequence;

transmitting a first sequence of information on the link from the first to a second or more processors;

detecting the first sequence of information at a third or more processors, and in response thereto, the third or more processors transmitting additional sequences of information into said single message at the end of the first sequence of information; and following the sequences of information from the third or more processors, transmitting an end of message signal which terminates said message.

24. A method as in claim 23 wherein the central controller is one of the third or more processors transmitting additional sequences of information into said single message at the end of the first sequence of information.

25. A method as in claim 23 wherein the third or more processors transmitting additional sequences of information in connection with said single message, at the end of the first sequence of information provides the identity of the second processor.

26. A method as in claim 25 wherein the second processor is part of a group and will compare group numbers stored in the processor with group numbers transmitted in the message as said additional sequences of information.

27. A method as in claim 26 wherein the second processor will execute predetermined functions if the group number matches one or more group numbers stored in the second processor.

28. In a distributed processor system including multiple processors interconnected on a communications link, a method of inter-processor communication using a communications link comprising:

transmitting a single message comprised of sequences of information transmitted from at least two processors;

generating a start of message signal by a first processor to start the message sequence followed by transmitting a first sequence of information on the link from the first processor to a second processor; and detecting the first sequence of information at a third or more processors, and in response thereto, the third or more processors transmitting additional sequences of information into said single message at the end of the first sequence of information; and following the sequence of information at a third or more processors, and in response thereto, the third or more processors transmitting additional sequences of information into said single message at the end of the first sequence of information; and following the sequences of information from the third or more processors, transmitting an end of message signal which terminates said message.

29. A method as in claim 28 wherein the first processor generates both the start of message signal and the end of message signal.

30. A method as in claim 28 wherein the last processor to transmit additional sequences of information into said message generates said end of message signal.

31. A method as in claim 28 wherein the third or more processors transmitting additional sequences of information in connection with said single message at the end of the first sequence of information provides the identity of the second processor.

32. A method as in claim 31 wherein the second processor is part of a group and will compare group numbers stored in the processor with group numbers transmitted in the message as said additional sequences of information.

33. A method as in claim 32 wherein the second processor will execute predetermined functions if the group number matches one or more group numbers stored in the second processor.

* * * * *